(12) United States Patent
Kim et al.

(10) Patent No.: US 11,886,167 B2
(45) Date of Patent: *Jan. 30, 2024

(54) METHOD, SYSTEM, AND NON-TRANSITORY COMPUTER-READABLE RECORDING MEDIUM FOR SUPPORTING OBJECT CONTROL

(71) Applicant: VTOUCH CO., LTD., Seoul (KR)

(72) Inventors: Seok Joong Kim, Seoul (KR); Jik Han Jung, Yongin-si (KR)

(73) Assignee: VTOUCH CO., LTD., Seoul (KR)

( * ) Notice: Subject to any disclaimer, the term of this patent is extended or adjusted under 35 U.S.C. 154(b) by 653 days.

This patent is subject to a terminal disclaimer.

(21) Appl. No.: 17/069,472

(22) Filed: Oct. 13, 2020

(65) Prior Publication Data

US 2021/0026333 A1     Jan. 28, 2021

Related U.S. Application Data

(63) Continuation of application No. PCT/KR2019/011999, filed on Sep. 17, 2019.

(30) Foreign Application Priority Data

Sep. 19, 2018   (KR) .................. 10-2018-0112447

(51) Int. Cl.
*G05B 19/4155*     (2006.01)
*G06V 40/20*     (2022.01)

(52) U.S. Cl.
CPC ......... *G05B 19/4155* (2013.01); *G06V 40/20* (2022.01); *G05B 2219/36504* (2013.01)

(58) Field of Classification Search
CPC ...... G05B 19/4155; G05B 2219/36504; G06V 40/20

(Continued)

(56) References Cited

U.S. PATENT DOCUMENTS 11,334,171 B2 *   5/2022   Gribetz .............. G02B 27/017
2012/0254809 A1  10/2012   Yang et al.

(Continued)

FOREIGN PATENT DOCUMENTS

JP     2016521894 A     7/2016
JP     2017207385 A    11/2017

(Continued)

OTHER PUBLICATIONS

International Search Report of PCT/KR2019/011999 dated Jan. 3, 2020.

*Primary Examiner* — Md Azad
(74) *Attorney, Agent, or Firm* — Dinsmore & Shohl LLP; Yongsok Choi, Esq.

(57) ABSTRACT

The present invention relates to a method, system, and non-transitory computer-readable recording medium for assisting object control. According to one aspect of the invention, there is provided a method for assisting object control, comprising the steps of: determining a dominant component capable of dominantly representing a motion made by a user with reference to a trace of the motion, and dynamically establishing a motion reference spatial coordinate system with reference to the dominant component; and recognizing an intention of the motion with reference to at least one of the trace specified with respect to the motion reference spatial coordinate system and properties of the trace.

9 Claims, 6 Drawing Sheets

(58) Field of Classification Search
USPC .......................................................... 700/56
See application file for complete search history.

(56) References Cited

U.S. PATENT DOCUMENTS

| | | |
|---|---|---|
| 2013/0278501 A1 | 10/2013 | Bulzacki |
| 2013/0321347 A1* | 12/2013 | Kim ........................ G06F 3/042 |
| | | 345/175 |
| 2014/0191958 A1* | 7/2014 | Chen ................... G06F 3/04812 |
| | | 345/157 |
| 2015/0145830 A1* | 5/2015 | Kim ........................ G06F 3/042 |
| | | 345/175 |
| 2016/0092504 A1 | 3/2016 | Mitri et al. |
| 2016/0179205 A1* | 6/2016 | Katz ........................ G06F 3/013 |
| | | 345/156 |
| 2018/0173318 A1* | 6/2018 | Kim ........................ G06V 40/28 |
| 2019/0163284 A1* | 5/2019 | Kim ........................ G06V 40/28 |

FOREIGN PATENT DOCUMENTS

| KR | 1020100118317 A | 11/2010 |
|---|---|---|
| KR | 1020140060604 A | 5/2014 |
| KR | 101850410 B1 | 4/2018 |
| KR | 1020180044757 A | 5/2018 |
| KR | 1020180045745 A | 5/2018 |

\* cited by examiner

METHOD, SYSTEM, AND NON-TRANSITORY COMPUTER-READABLE RECORDING MEDIUM FOR SUPPORTING OBJECT CONTROL

CROSS-REFERENCE TO RELATED APPLICATION(S)

This application is a continuation application of Patent Cooperation Treaty (PCT) International Application No. PCT/KR2019/011999 filed on Sep. 17, 2019, which claims priority to Korean Patent Application No. 10-2018-0112447 filed on Sep. 19, 2018. The entire contents of PCT International Application No. PCT/KR2019/011999 and Korean Patent Application No. 10-2018-0112447 are hereby incorporated by reference.

FIELD OF THE INVENTION

The present invention relates to a method, system, and non-transitory computer-readable recording medium for assisting object control.

BACKGROUND

In recent years, as interest in augmented reality (AR) or virtual reality (VR) is increasing and research and development in related technical fields are actively carried out, techniques for assisting a user to control a device, a virtual object, or the like in a real space or a virtual reality space on the basis of the user's gaze and motion have been introduced.

FIG. 1 illustratively shows a conventional technique for controlling an object using a user's gaze and gesture.

Referring to FIG. 1, according to one example of conventional techniques, the channel of a television 50 is changed to a next one when an extension 30 from a gaze 10 of a user to a fingertip 20 of the user comes into contact 40 with a television 50 and then the fingertip 20 of the user is moved in a rightward direction 60 so that the fingertip 20 moving rightward is recognized, or the volume of the television 50 may be reduced when the fingertip 20 of the user is moved toward the user (i.e., in a backward direction 70) so that the fingertip 20 moving toward the user is recognized.

However, according to the techniques introduced so far as well as the above-described conventional technique, when an intention of the user who controls an object using his/her body part like the fingertip 20 is determined, the user's gesture and intention are recognized on the basis of an initially preestablished spatial coordinate system without considering the user's conditions or characteristics (e.g., habitual or physical ones) (e.g., without considering a direction in which the user faces the object, whether the user is sitting or standing, an angle between the user's body and hand, mainly used joints, etc.), and thus there occurs a problem that the user's motion (i.e., movement) is misrecognized differently from the user's intention due to various factors such as physical characteristics of the user or a positional relationship between the user and a camera.

Further, according to the conventional techniques, even when a direction of a motion made by the user changes in real time, the user's motion can only be recognized by recognizing the user's motion on the basis of a preestablished spatial coordinate system or by situationally correcting the preestablished spatial coordinate system. However, with the conventional techniques, there is a limitation that it is difficult to accurately recognize the user's motion in an actual use environment in which the type of motion made by the user or the positional relationship between the user and the camera rapidly changes in various ways.

In this connection, the inventor(s) present a technique for accurately and quickly recognizing an intention of a motion made by a user, by dynamically establishing a motion reference spatial coordinate system capable of representing a dominant component of the motion made by the user, and analyzing a trace of the motion specified with respect to the motion reference spatial coordinate system or properties of the trace.

SUMMARY OF THE INVENTION

One object of the present invention is to solve all the above-described problems.

Another object of the invention is to accurately and quickly recognize an intention of a motion made by a user, by dynamically establishing a motion reference spatial coordinate system capable of representing a dominant component of the motion made by the user, and analyzing a trace of the motion specified with respect to the motion reference spatial coordinate system or properties of the trace.

Yet another object of the invention is to more efficiently recognize an intention of a motion made by a user in a three-dimensional real-world space, by recognizing the motion made by the user with respect to a motion reference spatial coordinate system of dimensions less than three (i.e., by reducing the number of dimensions required for the motion recognition).

The representative configurations of the invention to achieve the above objects are described below.

According to one aspect of the invention, there is provided a method for assisting object control, comprising the steps of: determining a dominant component capable of dominantly representing a motion made by a user with reference to a trace of the motion, and dynamically establishing a motion reference spatial coordinate system with reference to the dominant component; and recognizing an intention of the motion with reference to at least one of the trace specified with respect to the motion reference spatial coordinate system and properties of the trace.

According to another aspect of the invention, there is provided a system for assisting object control, comprising: a spatial coordinate system management unit configured to determine a dominant component capable of dominantly representing a motion made by a user with reference to a trace of the motion, and to dynamically establish a motion reference spatial coordinate system with reference to the dominant component; and a motion recognition unit configured to recognize an intention of the motion with reference to at least one of the trace specified with respect to the motion reference spatial coordinate system and properties of the trace.

In addition, there are further provided other methods and systems to implement the invention, as well as non-transitory computer-readable recording media having stored thereon computer programs for executing the methods.

According to the invention, it is possible to accurately and quickly recognize an intention of a motion made by a user in an actual use environment, by dynamically establishing a motion reference spatial coordinate system capable of representing a dominant component of the motion made by the user, and analyzing a trace of the motion specified with respect to the motion reference spatial coordinate system or properties of the trace.

According to the invention, it is possible to more efficiently recognize an intention of a motion made by a user in a three-dimensional real-world space, by recognizing the motion made by the user with respect to a motion reference spatial coordinate system of dimensions less than three (i.e., by reducing the number of dimensions required for the motion recognition).

DETAILED DESCRIPTION

Figure 1:
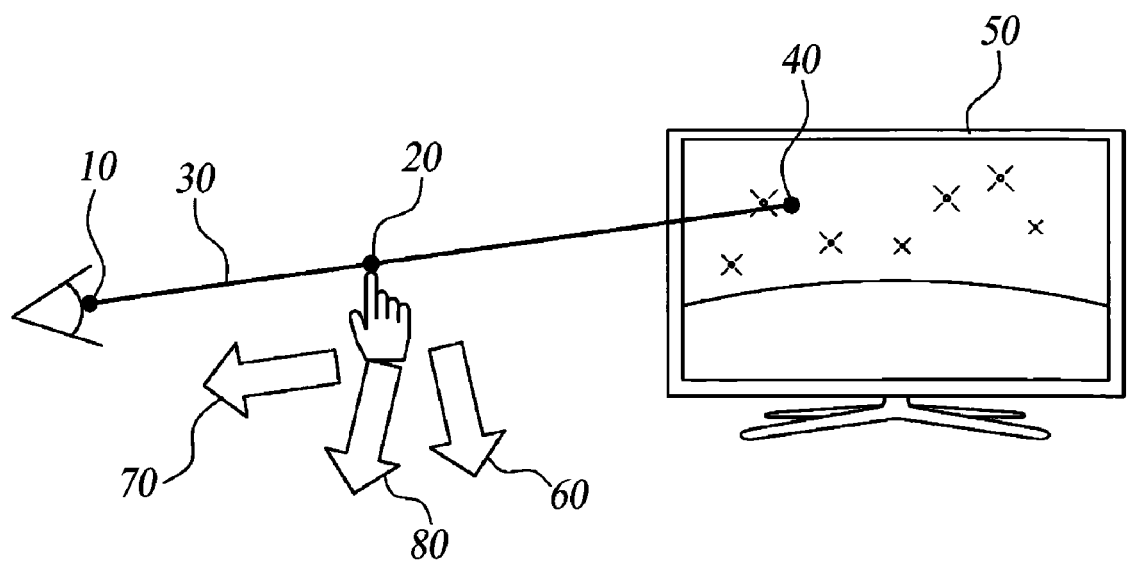
FIG. 1 illustratively shows a conventional technique for controlling an object using a user's gaze and gesture.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each of the embodiments may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

Figure 2:
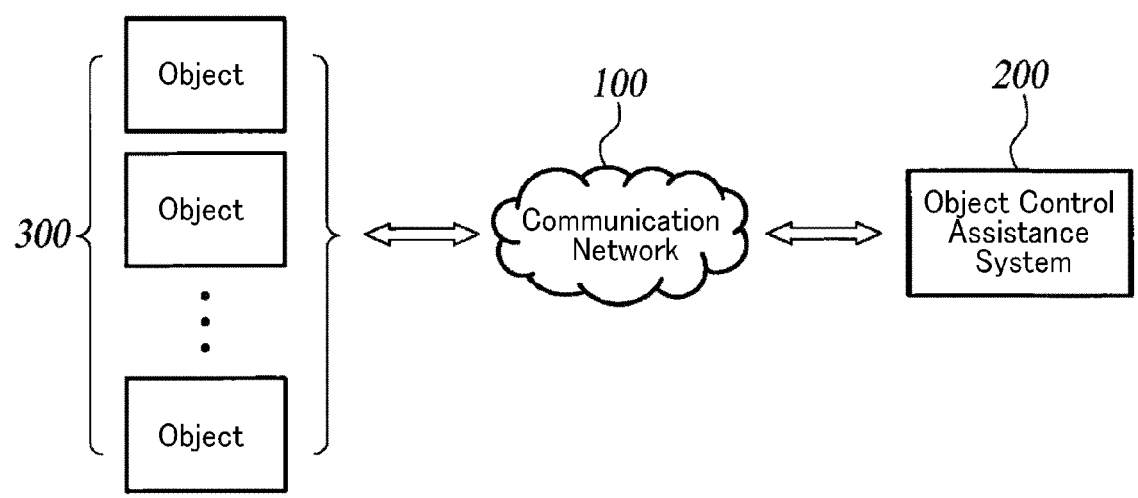
FIG. 2 illustratively shows the configuration of an entire system for assisting object control according to one embodiment of the invention.

FIG. 2 illustratively shows the configuration of the entire system for assisting object control according to one embodiment of the invention.

As shown in FIG. 2, the entire system according to one embodiment of the invention may comprise a communication network 100, an object control assistance system 200, and an object 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as radio frequency (RF) communication, WiFi communication, cellular communication (e.g., Long Term Evolution (LTE) communication), Bluetooth communication (more specifically, Bluetooth Low Energy (BLE) communication), infrared communication, and ultrasonic communication.

Next, the object control assistance system 200 according to one embodiment of the invention may be a digital device having a memory means and a microprocessor for computing capabilities. The object control assistance system 200 may be a server system.

According to one embodiment of the invention, the object control assistance system 200 may function to determine a dominant component capable of dominantly representing a motion made by a user with reference to a trace of the motion and dynamically establish a motion reference spatial coordinate system with reference to the determined dominant component, and to recognize an intention of the motion with reference to at least one of the trace of the motion specified with respect to the motion reference spatial coordinate system and properties of the trace of the motion.

The motion described herein means all movements performed by the user, and may encompass a plurality of unit motions specified on the basis of data (e.g., positions, angles, directions, etc.) acquired for each reference time or reference distance that is set to recognize or measure the motion, or may refer to each of the plurality of unit motions. For example, the user's motion according to one embodiment of the invention may be specified on the basis of data measured every 1/10 seconds, or specified whenever a position change of 1 cm or more occurs.

Further, according to one embodiment of the invention, the trace of the motion made by the user may be specified on the basis of a plurality of frames constituting a video in which a feature point (e.g., a fingertip of the user, a pointer held by the user, or the like) serving as a basis of the motion is photographed. Specifically, according to one embodiment of the invention, the trace of the motion made by the user may be acquired by accumulating three-dimensional spatial coordinate values of a feature point serving as a basis of the motion in a spatial coordinate system over time.

Meanwhile, according to one embodiment of the invention, the trace of the motion may also be specified by accumulating measurement data from another sensing means such as an acceleration sensor or a gyroscope sensor over time.

The configuration and functions of the object control assistance system 200 according to the invention will be discussed in more detail below. Meanwhile, although the object control assistance system 200 has been described as above, the above description is illustrative, and it will be apparent to those skilled in the art that at least a part of the functions or components required for the object control assistance system 200 may be implemented or included in the object 300 to be controlled or an external system (not shown), as necessary.

Next, according to one embodiment of the invention, the object 300 may function as an object that may be controlled by a motion made by a user. That is, according to one embodiment of the invention, the object 300 may receive a control manipulation according to the motion of the user from the object control assistance system 200, another object 300, or an external system (not shown), and allow its operation or function to be controlled according to the received control manipulation. According to one embodiment of the invention, the object 300 may be a real object existing in the real world, or a virtual object that may exist in virtual reality or may be augmented, mixed, or merged to the real world.

Specifically, the object 300 according to one embodiment of the invention may be a device that may function to connect to and then communicate with the object control assistance system 200, another object 300, or an external system (not shown), and any type of device having a memory means and a microprocessor for computing capabilities may be adopted as the object 300 according to the invention. According to one embodiment of the invention, the object 300 may be a wearable device such as smart glasses, a smart watch, a smart band, a smart ring, and a smart necklace, or may be a somewhat traditional device such as a smart phone, a smart pad, a desktop computer, a notebook computer, a workstation, a personal digital assistant (PDA), a web pad, and a mobile phone. Further, according to one embodiment of the invention, the object 300 may also be an IoT (Internet of Things) device such as a television, a speaker, a lamp, an air conditioner, a humidifier, a chest of drawers, a window, and a blind.

Furthermore, the object 300 according to one embodiment of the invention may be a general object having a predetermined physical position in the real world, which may not function to communicate with the object control assistance system 200, another object 300, or an external system (not shown), or may not have a memory means or a microprocessor. For example, a general object such as a thermometer, a photograph, a picture, a doll, and a mirror may be adopted as the object 300 according to one embodiment of the invention.

Meanwhile, according to one embodiment of the invention, the object 300 as a device may include an application for performing functions according to the invention. The application may reside in the device in the form of a program module. The characteristics of the program module may be generally similar to those of a spatial coordinate system management unit 210 and a motion recognition unit 220 of the object control assistance system 200. Here, at least a part of the application may be replaced with a hardware device or a firmware device that may perform a substantially equal or equivalent function, as necessary.

Configuration of the Object Control Assistance System

Hereinafter, the internal configuration of the object control assistance system 200 crucial for implementing the invention and the functions of the respective components thereof will be discussed.

Figure 3:
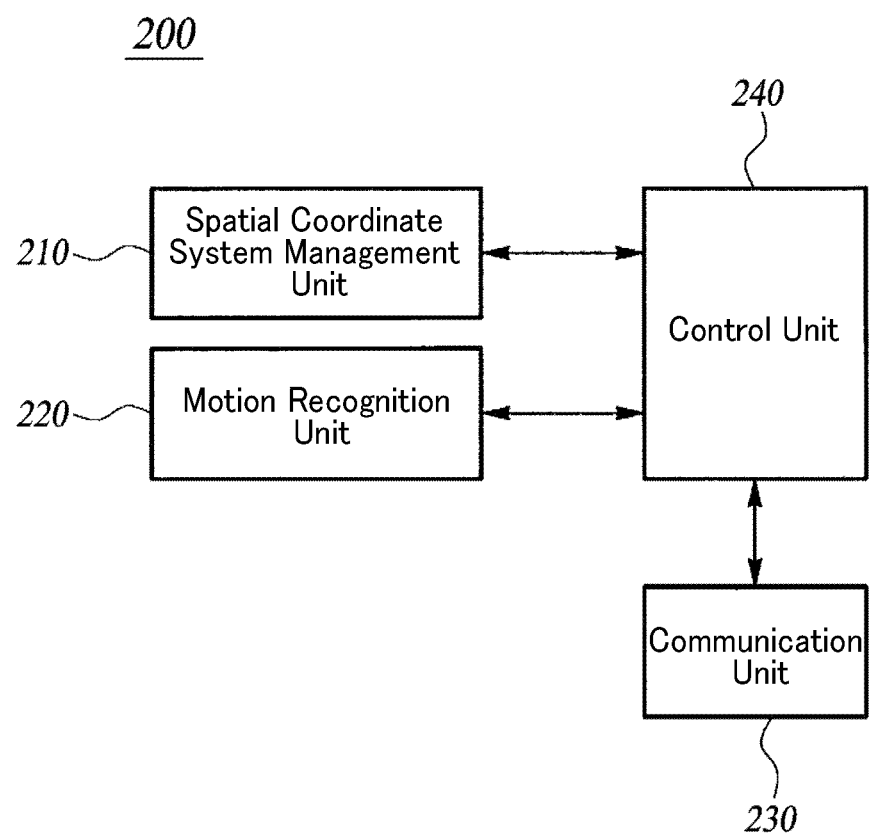
FIG. 3 specifically shows the internal configuration of an object control assistance system according to one embodiment of the invention.

FIG. 3 specifically shows the internal configuration of the object control assistance system 200 according to one embodiment of the invention.

As shown in FIG. 3, the object control assistance system 200 according to one embodiment of the invention may comprise a spatial coordinate system management unit 210, a motion recognition unit 220, a communication unit 230, and a control unit 240. According to one embodiment of the invention, at least some of the spatial coordinate system management unit 210, the motion recognition unit 220, the communication unit 230, and the control unit 240 may be program modules to communicate with an external system. The program modules may be included in the object control assistance system 200 in the form of operating systems, application program modules, and other program modules, while they may be physically stored in a variety of commonly known storage devices. Further, the program modules may also be stored in a remote storage device that may communicate with the object control assistance system 200. Meanwhile, such program modules may include, but not limited to, routines, subroutines, programs, objects, components, data structures, and the like for performing specific tasks or executing specific abstract data types as will be described below in accordance with the invention.

First, according to one embodiment of the invention, the spatial coordinate system management unit 210 may determine a dominant component capable of dominantly representing a motion made by a user with reference to a trace of the motion.

Specifically, the spatial coordinate system management unit 210 according to one embodiment of the invention may determine a direction and a size of the dominant component from the trace of the motion, and determine a number of dimensions and reference coordinate axes of a motion reference spatial coordinate system (to be described below) on the basis of the determined direction and size of the dominant component. More specifically, according to one embodiment of the invention, the number of dimensions may be determined on the basis of a number of dominant components whose size is not less than a threshold level, and the reference coordinate axes may be determined on the basis of directions of the dominant components whose size is not less than the threshold level.

For example, the spatial coordinate system management unit 210 according to one embodiment of the invention may determine the direction and size of the dominant component of the motion using at least one of singular value decomposition, eigen decomposition, principal component analysis, latent semantic analysis, and non-negative matrix factorization.

Hereinafter, embodiments in which the direction and size of the dominant component of the motion are determined using principal component analysis will be discussed in detail.

According to one embodiment of the present invention, the spatial coordinate system management unit 210 may derive a principal component from the trace of the motion using principal component analysis, and determine the direction and size of the dominant component of the motion on the basis of the derived principal component. The principal component analysis described herein is an analysis method that converts high-dimensional data into low-dimensional data, wherein an orthogonal transformation may be used to convert samples of a high-dimensional space that are likely to be correlated into samples of a low-dimensional space that are linearly uncorrelated, and the number of dimensions of the principal component may be less than or equal to the number of dimensions of the original samples.

Specifically, the spatial coordinate system management unit 210 according to one embodiment of the invention may select representative points by performing singular value decomposition on a plurality of points constituting the trace of the motion in a three-dimensional coordinate system, and when the selected points are projected onto certain coordinate axes corresponding to the dominant components, the coordinate axis where their variance is the greatest may be determined as a first principal component, and the coordinate axis where the variance is the second greatest may be determined as a second principal component.

For example, when performing the principal component analysis on the trace of the motion made by the user, the spatial coordinate system management unit 210 according to one embodiment of the invention may (i) determine that the motion has no dominant component (e.g., the motion is a still motion) when a variable ratio PC1 of the first principal component is less than a threshold level; (ii) determine that the motion has one dominant component (e.g., the motion is a forward, backward, upward, downward, leftward, or rightward motion) when the variable ratio PC1 of the first principal component is equal to or greater than the threshold level and a variable ratio PC2 of the second principal component is less than the threshold level; (iii) determine that the motion has two dominant components (e.g., the motion is a rotating motion or a motion of drawing a figure or character on a two-dimensional plane) when both of the variable ratio PC1 of the first principal component and the variable ratio PC2 of the second principal component are equal to or greater than the threshold level, and the relative value of the variable ratio PC2 of the second principal component to the variable ratio PC1 of the first principal component (i.e., PC2/PC1) is equal to or greater than the threshold level; and (iv) determine that the motion has three dominant components (e.g., the motion is a helical motion) when all of the variable ratio PC1 of the first principal component, the variable ratio PC2 of the second principal component, and a variable ratio PC3 of a third principal component are equal to or greater than the threshold level.

Further, according to one embodiment of the invention, the spatial coordinate system management unit 210 may dynamically establish a motion reference spatial coordinate system with reference to the determined dominant component. Specifically, the spatial coordinate system management unit 210 according to one embodiment of the invention may determine a number of dimensions and reference coordinate axes of the motion reference spatial coordinate system on the basis of the direction and size of the determined dominant component.

For example, the spatial coordinate system management unit 210 according to one embodiment of the invention may (i) determine that the motion reference spatial coordinate system is a zero-dimensional coordinate system when the motion is determined to have no dominant component; (ii) when the motion is determined to have one dominant component, establish the motion reference spatial coordinate system as a one-dimensional spatial coordinate system specified in a reference coordinate axis corresponding to the direction of the dominant component; (iii) when the motion is determined to have two dominant components, establish the motion reference spatial coordinate system as a two-dimensional spatial coordinate system specified in two reference coordinate axes respectively corresponding to the directions of the two dominant components; and (iv) when the motion is determined to have three dominant components, establish the motion reference spatial coordinate system as a three-dimensional spatial coordinate system specified in three reference coordinate axes respectively corresponding to the directions of the three dominant components.

Meanwhile, according to one embodiment of the invention, since the spatial coordinate system management unit 210 may dynamically establish the motion reference spatial coordinate system with reference to the dominant component of the motion made by the user, the motion reference spatial coordinate system may be changed to suit for recognition of the motion (i.e., adaptively) as the motion made by the user is changed. For example, a one-dimensional spatial coordinate system specified by one reference coordinate axis may be established as the motion reference spatial coordinate system when the user makes a one-dimensional motion such as a forward or backward motion, and a two-dimensional spatial coordinate system specified by two reference coordinate axes (i.e., a two-dimensional reference coordinate plane) may be established as the motion reference spatial coordinate system when the user makes a two-dimensional motion such as rotation.

Although the embodiments in which the principal component analysis is used to determine the dominant component of the motion made by the user have been mainly described above, it is noted that the scope of the invention is not necessarily limited to the above embodiments, and any other techniques may be used as long as they can determine the dominant component of the motion. According to another embodiment of the invention, the spatial coordinate system management unit 210 may determine the dominant component of the motion using techniques such as eigen decomposition, latent semantic analysis, and non-negative matrix factorization.

Meanwhile, according to one embodiment of the invention, the object control assistance system 200 may further include a user interface management unit (not shown) configured to, when a motion reference spatial coordinate system capable of representing a dominant component of a motion made by the user is established with reference to a trace of the motion, assist the user's understanding by visually providing graphic elements related to the motion reference spatial coordinate system. For example, the user interface management unit (not shown) according to one embodiment of the invention may display a dot (•) shaped graphic element when the motion reference spatial coordinate system is established to be zero-dimensional; display an arrow (->) shaped graphic element when the motion reference spatial coordinate system is established to be one-dimensional; and display a "@" shaped graphic element when the motion reference spatial coordinate system is established to be two-dimensional. Further, according to one embodiment of the invention, the graphic elements displayed as above may be dynamically changed as the motion made by the user is changed.

Next, according to one embodiment of the invention, the motion recognition unit 220 may recognize an intention of the motion with reference to at least one of the trace of the motion specified with respect to the motion reference spatial coordinate system and properties of the trace of the motion.

Figure 4:
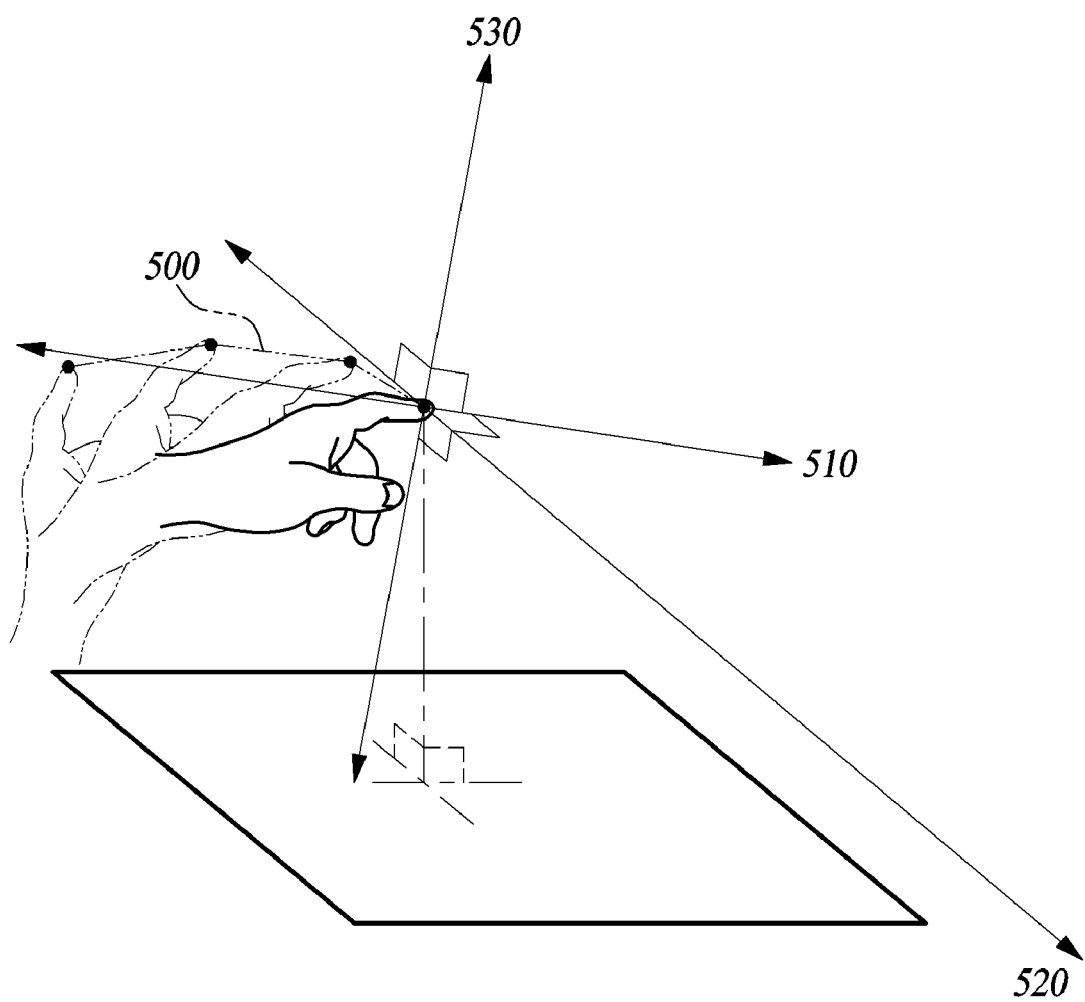
FIG. 4 illustratively shows a case in which a motion reference spatial coordinate system is established to be one-dimensional according to one embodiment of the invention.

FIG. 4 illustratively shows a case in which a motion reference spatial coordinate system is established to be one-dimensional according to one embodiment of the invention.

Referring to FIG. 4, the spatial coordinate system management unit 210 according to one embodiment of the invention may determine a reference coordinate axis 510 corresponding to a dominant component of a trace 500 of a motion made by a user's fingertip, and establish a one-dimensional spatial coordinate system specified by the determined reference coordinate axis 510 as a motion reference spatial coordinate system. Here, according to one embodiment of the invention, it may be determined that a direction away from the user is a positive direction of the reference coordinate axis 510.

Meanwhile, the spatial coordinate system management unit 210 according to another embodiment of the invention may further determine a first auxiliary coordinate axis 520 that is orthogonal to the reference coordinate axis 510 and parallel to a ground surface, and a second auxiliary coordinate axis 530 that is orthogonal to both of the reference coordinate axis 510 and the first auxiliary coordinate axis 520, thereby establishing a three-dimensional spatial coordinate system specified by the reference coordinate axis 510, the first auxiliary coordinate axis 520, and the second auxiliary coordinate axis 530 as the motion reference spatial coordinate system.

Referring further to FIG. 4, the motion recognition unit 220 according to one embodiment of the invention may analyze the motion with reference to the trace 500 of the motion, which is specified with respect to the reference coordinate axis 510 of the established motion reference spatial coordinate system, and changes of the trace 500 of the motion, and may recognize an intention of the motion on the basis of a result of the analysis.

Figure 5:
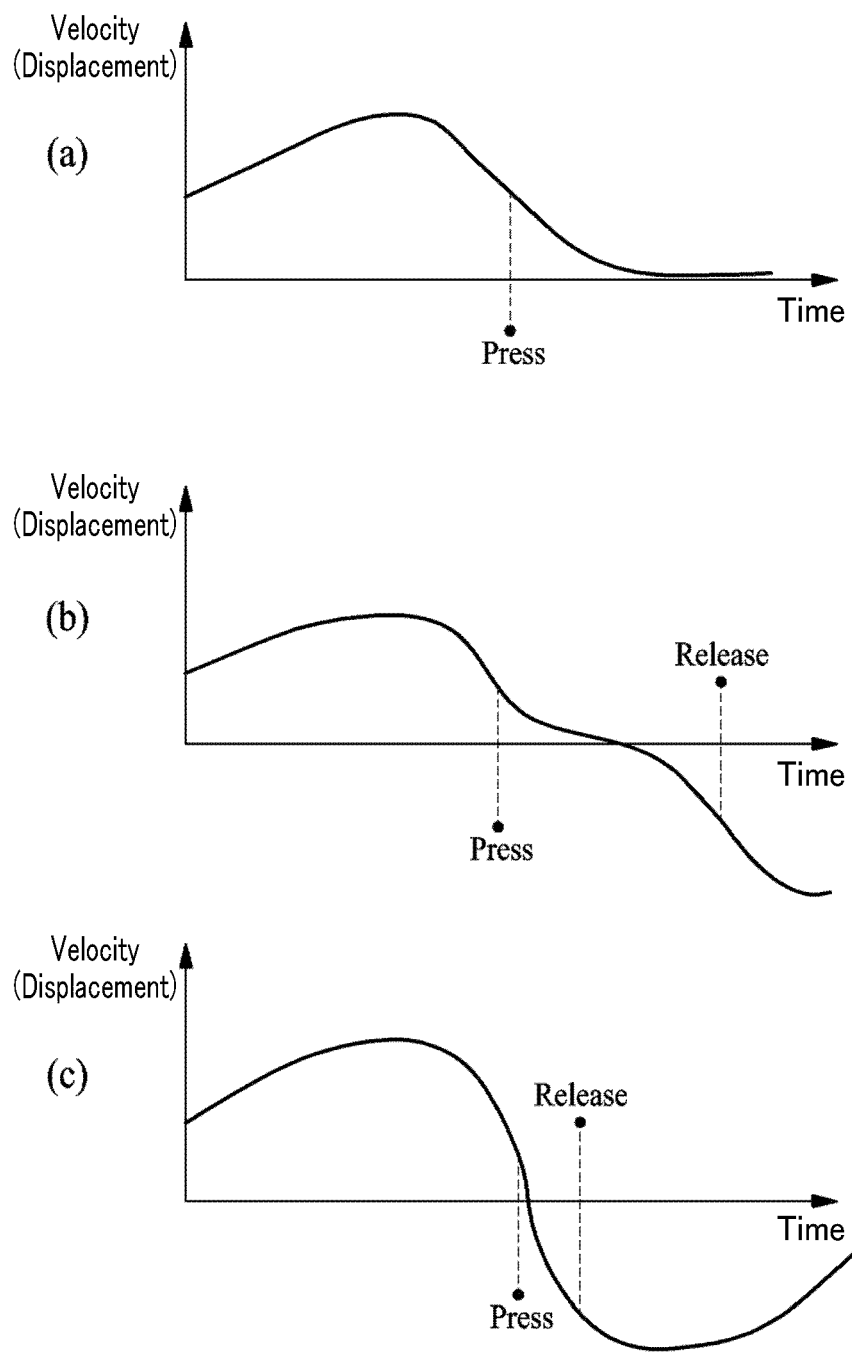
FIG. 5 illustratively shows how to recognize an intention of a motion with reference to a trace of the motion specified with respect to a motion reference spatial coordinate system established to be one-dimensional or changes of the trace according to one embodiment of the invention.

FIG. 5 illustratively shows how to recognize an intention of a motion with reference to a trace of the motion specified with respect to a motion reference spatial coordinate system established to be one-dimensional or changes of the trace according to one embodiment of the invention.

Referring to FIG. 5, the motion recognition unit 220 according to one embodiment of the invention may recognize an intention of a motion with reference to a trace of the motion specified with respect to the reference coordinate axis 510 of the motion reference spatial coordinate system or properties of the trace of the motion.

For example, when there appears a section in which a velocity (or displacement) of the trace of the motion rapidly decreases while having a positive value with respect to the reference coordinate axis (i.e., when there appears a trace of moving forward and then stopping with respect to the reference coordinate axis), the motion recognition unit 220 according to one embodiment of the invention may recognize that the user makes a motion of pressing an object in front of the user.

As another example, when there appears a section in which the velocity of the trace of the motion rapidly decreases while having a negative value with respect to the reference coordinate axis (i.e., when there appears a trace of moving backward with respect to the reference coordinate axis), the motion recognition unit 220 according to one embodiment of the invention may recognize that the user makes a motion of releasing an object in front of the user.

As yet another example, when there appears a section in which the velocity of the trace of the motion has a positive value and then rapidly decreases to have a negative value with respect to the reference coordinate axis (i.e., when there appears a trace of moving forward and then moving backward with respect to the reference coordinate axis), the motion recognition unit 220 according to one embodiment of the invention may recognize that the user makes a motion of lightly tapping an object in front of the user.

Meanwhile, although the embodiments in which the motions of moving forward and backward with respect to the user are recognized have been mainly described in connection with FIGS. 4 and 5, it is noted that the present invention is not necessarily limited to the embodiments of FIGS. 4 and 5, and any embodiments in which motions of moving upward, downward, leftward, and rightward with respect to the user are recognized are feasible.

Figure 6:
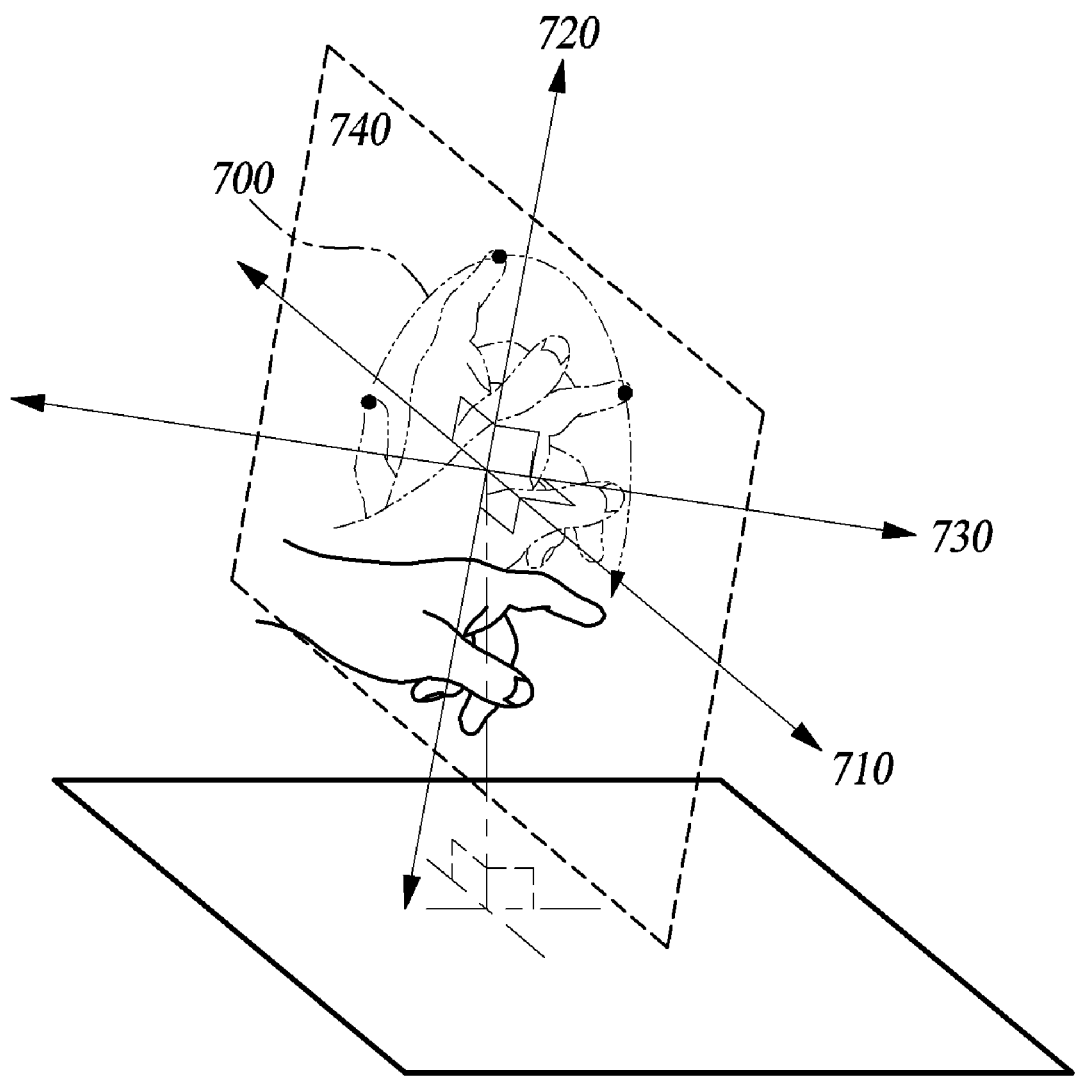
FIG. 6 illustratively shows a case in which a motion reference spatial coordinate system is established to be two-dimensional according to one embodiment of the invention.

FIG. 6 illustratively shows a case in which a motion reference spatial coordinate system is established to be two-dimensional according to one embodiment of the invention.

Referring to FIG. 6, the spatial coordinate system management unit 210 according to one embodiment of the invention may determine a first reference coordinate axis 710 and a second reference coordinate axis 720 corresponding to dominant components of a trace 700 of a motion made by a user's fingertip, and establish a two-dimensional spatial coordinate system specified by a combination of the two determined reference coordinate axes 710 and 720 (i.e., a reference coordinate plane) as a motion reference spatial coordinate system.

Meanwhile, the spatial coordinate system management unit 210 according to another embodiment of the invention may further determine an auxiliary coordinate axis 730 that is orthogonal to both of the first reference coordinate axis 710 and the second reference coordinate axis 720, thereby establishing a three-dimensional spatial coordinate system specified by the first reference coordinate axis 710, the second reference coordinate axis 720, and the auxiliary coordinate axis 730 as the motion reference spatial coordinate system.

Referring further to FIG. 6, the motion recognition unit 220 according to one embodiment of the invention may analyze the motion with reference to the trace 700 of the motion, which is specified with respect to the reference coordinate plane of the established motion reference spatial coordinate system, and changes of the trace 700 of the motion, and may recognize an intention of the motion on the basis of a result of the analysis.

Figure 7:
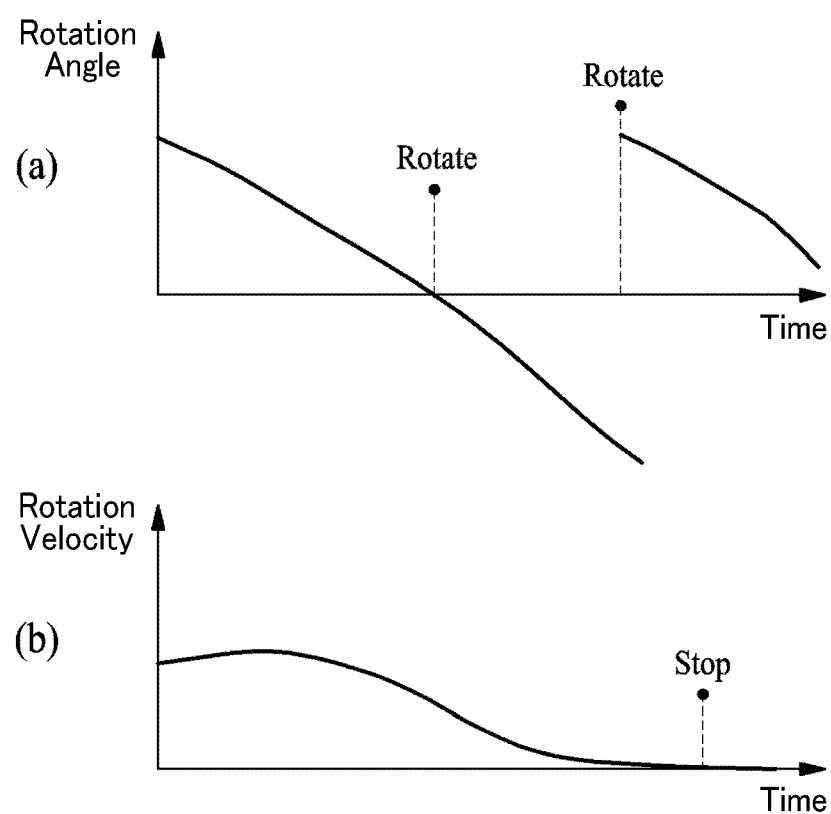
FIG. 7 illustratively shows how to recognize an intention of a motion with reference to a trace of the motion specified with respect to a motion reference spatial coordinate system established to be two-dimensional or changes of the trace according to one embodiment of the invention.

FIG. 7 illustratively shows how to recognize an intention of a motion with reference to a trace of the motion specified with respect to a motion reference spatial coordinate system established to be two-dimensional or changes of the trace according to one embodiment of the invention.

Referring to FIG. 7, the motion recognition unit 220 according to one embodiment of the invention may recognize an intention of a motion with reference to properties (e.g., a rotation direction, a rotation angle, a rotation velocity, etc.) of a trace of the motion specified with respect to a reference coordinate plane 740 of the motion reference spatial coordinate system.

For example, when there appears a section in which the trace of the motion rotates in a clockwise or counterclockwise direction with respect to the reference coordinate plane (i.e., when it appears that the trace of the motion makes a rotating trajectory on the reference coordinate plane), the motion recognition unit 220 according to one embodiment of the invention may recognize that the user makes a motion of rotating or swiping an object in front of the user.

Meanwhile, although the embodiments in which the dominant components may be represented by a reference coordinate plane that faces the user and is orthogonal to the ground surface have been mainly described in connection with FIGS. 6 and 7, it is noted that the present invention is not necessarily limited to the embodiments of FIGS. 6 and 7, and any embodiments in which the dominant components may be represented by a reference coordinate plane in a direction different from those of the embodiments of FIGS. 6 and 7 are feasible.

Meanwhile, according to one embodiment of the invention, the motion recognition unit 220 may determine whether a motion is effective when recognizing an intention of the motion with respect to a motion reference spatial coordinate system. Specifically, the motion recognition unit 220 according to one embodiment of the invention may determine whether a motion is effective with reference to at least one of properties of a previously (or most recently) recognized motion and properties of a currently recognized motion.

A more detailed description will be made with reference to FIGS. 4 and 5. The motion recognition unit 220 according to one embodiment of the invention may determine whether a motion is effective with reference to properties (e.g., a movement direction, a movement amount, a movement velocity, etc.) of a trace of the motion specified with respect to a reference coordinate axis.

For example, in FIGS. 4 and 5, the motion recognition unit 220 according to one embodiment of the invention may determine that a motion is effective when a movement velocity of a trace of the motion with respect to the reference coordinate axis is equal to or greater than a threshold level.

As another example, in FIGS. 4 and 5, the motion recognition unit 220 according to one embodiment of the invention may determine that a movement direction change of a motion is effective when a relative ratio between movement amounts of a forward motion and a backward motion which are temporally consecutive is equal to or greater than a threshold level (e.g., 40%).

A more detailed description will be made with reference to FIGS. 6 and 7. The motion recognition unit 220 according to one embodiment of the invention may determine whether a motion is effective with reference to properties (e.g., a rotation axis, a rotation direction. a rotation angle, a rotation radius, a rotation velocity, etc.) of a trace of the motion specified with respect to a reference coordinate plane.

For example, in FIGS. 6 and 7, the motion recognition unit 220 according to one embodiment of the invention may determine that a motion has effectively made one rotation when a trace of the motion is rotated by 270 degrees or more within 2 seconds with respect to the reference coordinate plane, and may determine that a motion has effectively made half a rotation when a trace of the motion is rotated by 135 degrees or more within one second with respect to the reference coordinate plane.

As another example, in FIGS. 6 and 7, the motion recognition unit 220 according to one embodiment of the invention may determine that a rotation direction change of a motion is effective when a relative ratio between rotation amounts of a forward rotational motion and a backward rotational motion which are temporally consecutive is equal to or greater than a threshold level (e.g., 40%).

As yet another example, the motion recognition unit 220 according to one embodiment of the invention may determine that a motion is made out of the reference coordinate plane when a ratio of an outlier far from the reference coordinate plane in a trace of the motion is equal to or greater than a threshold level.

Next, the communication unit 230 according to one embodiment of the invention may function to enable data transmission/reception from/to the spatial coordinate system management unit 210 and the motion recognition unit 220.

Lastly, the control unit 240 according to one embodiment of the invention may function to control data flow among the spatial coordinate system management unit 210, the motion recognition unit 220, and the communication unit 230. That is, the control unit 240 according to the invention may control data flow into/out of the object control assistance system 200 or data flow among the respective components of the object control assistance system 200, such that the spatial coordinate system management unit 210, the motion recognition unit 220, and the communication unit 230 may carry out their particular functions, respectively.

Although the embodiments in which a user's intention is determined from a motion made by the user's body part have been mainly described above, it is noted that the present invention is not necessarily limited to using the user's body part, and an intention of the user's motion may be determined when the user uses a motion recognition means or the like as long as the objects of the invention may be achieved.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:
1. A method for assisting object control, comprising the steps of:
  specifying a trace of a motion made by a user on the basis of data or a plurality of frames acquired by a camera, determining a dominant component capable of dominantly representing the motion made by the user with reference to the trace of the motion;

dynamically establishing a motion reference spatial coordinate system with reference to the dominant component; and recognizing an intention of the motion with reference to at least one of the trace specified with respect to the motion reference spatial coordinate system and properties of the trace, wherein in the dynamically establishing step, a direction and a size of the dominant component are determined from the trace, and a number of dimensions of the motion reference spatial coordinate system and a reference coordinate axis of the motion reference spatial coordinate system are determined on the basis of the determined direction and size of the dominant component, wherein the number of dimensions is determined on the basis of a number of dominant components whose size is not less than a threshold level, and wherein the reference coordinate axis is determined on the basis of a direction of a dominant component whose size is not less than a threshold level.

2. The method of claim 1, wherein the trace of the motion is specified by accumulating measurement data on the motion over time.

3. The method of claim 1, wherein in the establishing step, the direction and size of the dominant component are derived using at least one of singular value decomposition, eigen decomposition, principal component analysis, latent semantic analysis, and non-negative matrix factorization.

4. The method of claim 1, wherein the motion reference spatial coordinate system is specified by a reference coordinate axis corresponding to the dominant component, or specified by the reference coordinate axis and an auxiliary coordinate axis established with respect to the reference coordinate axis.

5. The method of claim 1, wherein in the recognizing step, whether the motion is effective is determined with reference to at least one of properties of a previously recognized motion and properties of a currently recognized motion.

6. A non-transitory computer-readable recording medium having stored thereon a computer program for executing the method of claim 1.

7. A system for assisting object control, comprising:

a spatial coordinate system management unit configured to determine a dominant component capable of dominantly representing a motion made by a user with reference to a trace of the motion, and to dynamically establish a motion reference spatial coordinate system with reference to the dominant component; and a motion recognition unit configured to recognize an intention of the motion with reference to at least one of the trace specified with respect to the motion reference spatial coordinate system and properties of the trace, wherein the trace of the motion made by a user is specified on the basis of data or a plurality of frames acquired by a camera, wherein a direction and a size of the dominant component are determined from the trace, and a number of dimensions of the motion reference spatial coordinate system and a reference coordinate axis of the motion reference spatial coordinate system are determined on the basis of the determined direction and size of the dominant component, wherein the number of dimensions is determined on the basis of a number of dominant components whose size is not less than a threshold level, and wherein the reference coordinate axis is determined on the basis of a direction of a dominant component whose size is not less than a threshold level.

8. The method of claim 1, further comprising controlling an operation of an object based on the recognized intention of the motion.

9. The system of claim 1, further comprising:

a communication unit configured to transmit a control manipulation signal to an object based on the recognized intention of the motion.

* * * * *